Figure 2:
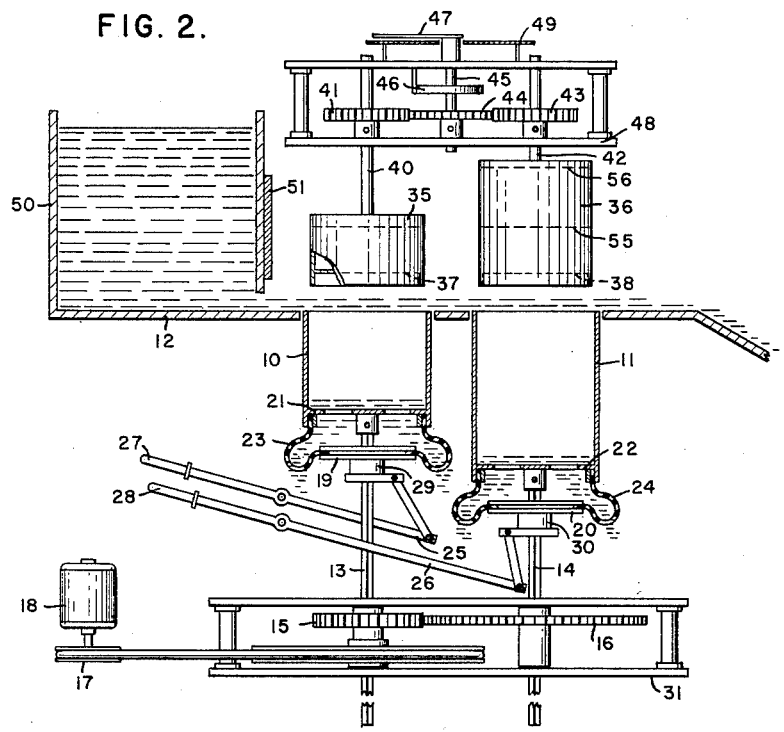

Dec. 25, 1962 E. E. KIMBERLY 3,069,900
METHOD AND APPARATUS FOR MEASURING PROPERTIES OF FLUID
Filed Oct. 23, 1959 4 Sheets-Sheet 1
FIG. 5.
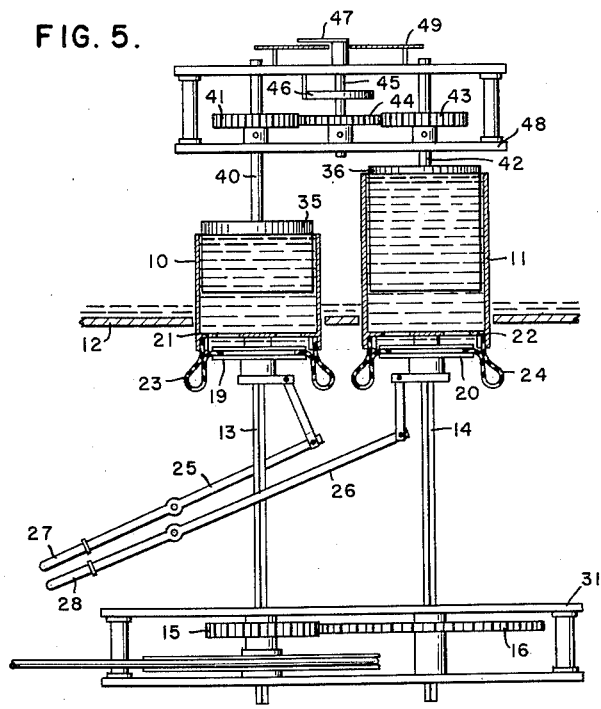
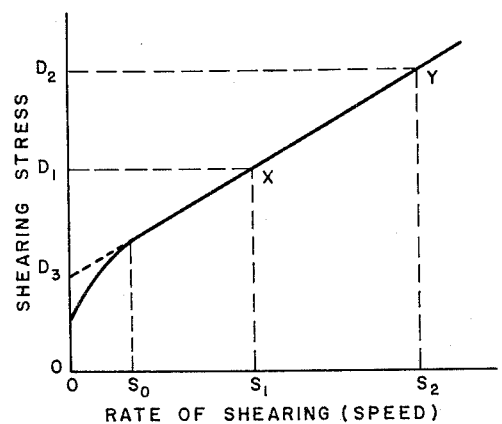
FIG. 1.
INVENTOR.
EMERSON E. KIMBERLY,
BY
ATTORNEY.

Dec. 25, 1962 E. E. KIMBERLY 3,069,900
METHOD AND APPARATUS FOR MEASURING PROPERTIES OF FLUID
Filed Oct. 23, 1959 4 Sheets-Sheet 2

INVENTOR.
EMERSON E. KIMBERLY,
BY
ATTORNEY.

Dec. 25, 1962  E. E. KIMBERLY  3,069,900
METHOD AND APPARATUS FOR MEASURING PROPERTIES OF FLUID
Filed Oct. 23, 1959  4 Sheets-Sheet 3

INVENTOR.
EMERSON E. KIMBERLY,
BY John S. Schneider
ATTORNEY.

INVENTOR.
EMERSON E. KIMBERLY,
BY John L. Schneider
ATTORNEY.

United States Patent Office 3,069,900
Patented Dec. 25, 1962

3,069,900
METHOD AND APPARATUS FOR MEASURING PROPERTIES OF FLUID
Emerson E. Kimberly, Los Angeles, Calif., assignor, by mesne assignments, to Jersey Production Research Company, Tulsa, Okla., a corporation of Delaware
Filed Oct. 23, 1959, Ser. No. 848,475
3 Claims. (Cl. 73—59)

The present invention is directed to method and apparatus for measuring flow properties of liquids and especially the properties of plastic viscosity and yield strength of well drilling liquids.

A large number of different types of liquids is used in drilling well bores. To a greater or lesser extent all of these liquids perform some of the following functions: (1) keep the borehole free of cuttings; (2) cool the bit and lubricate the drill pipe; (3) maintain the wall of the borehole; (4) control subsurface pressures; (5) suspend cuttings; and (6) protect the well bore in order that maximum borehole information can be obtained by logging at a later time.

In field operations the values of yield strength and plastic viscosity of the drilling fluid are important because the behavior of the drilling fluid in the borehole is critically dependent thereupon. For example, a very viscous drilling fluid is extremely hard to pump and may produce subsurface formation breakdown because of the increased down-the-hole pressures caused thereby; or a drilling fluid with an extremely high yield strength is very difficult to start pumping and also may produce formation damage. Consequently, very careful control is maintained over the plastic viscosity and yield strength of the drilling fluids during drilling operations.

This control is normally exercised by treating the mud with chemical additives. Certain additives are used to vary the plastic viscosity while other additives are used to change the yield strength. Therefore, when treating a mud which has deteriorated from use, it is necessary to know whether or not the yield strength or the plastic viscosity has been altered so that the proper chemical additives can be mixed with the drilling fluid.

Various devices and methods have been developed and used for measuring independently the values of yield strength and plastic viscosity. However, these instrumentations are relatively delicate and the procedures for their use are not simple. Therefore, while these devices are adequate for laboratory use, they are very seldom used in the field.

The present invention operates on the principal of shearing simultaneously a fluid at two different velocities; the resulting fluid shear stresses being converted to torques and the difference in the torques being recorded to indicate viscosity and yield strength of the fluid. In a preferred embodiment of the invention, two cups and two bobs are utilized. The fluid, the properties of which are to be measured, is located between each cup and its bob. In each cup and bob combination the cup is rotated at a selected speed and its bob, which is spring restrained, assumes a new rotatable position proportional to the shearing stress in the fluid between the opposed bob and cup surfaces caused by rotation of the cup.

Accordingly, a primary object of the present invention is to provide a device for use in measuring plastic viscosity and yield strength of drilling fluid that is sufficiently rugged for routine field operations; that is relatively simple in nature; that is easy for drilling crews to operate; that is inexpensive to construct; and that has little maintenance cost.

Another object of the present invention is to provide a novel method that can be used in the field for measuring plastic viscosity and yield strength of drilling fluids.

Figure 3:
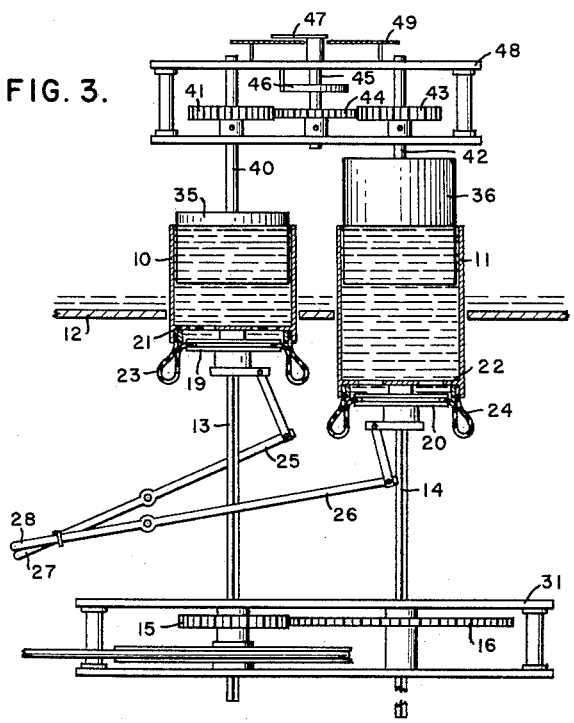
Figure 4:
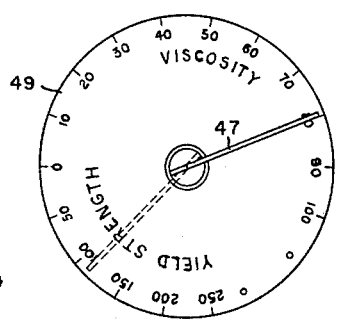
Figure 6:
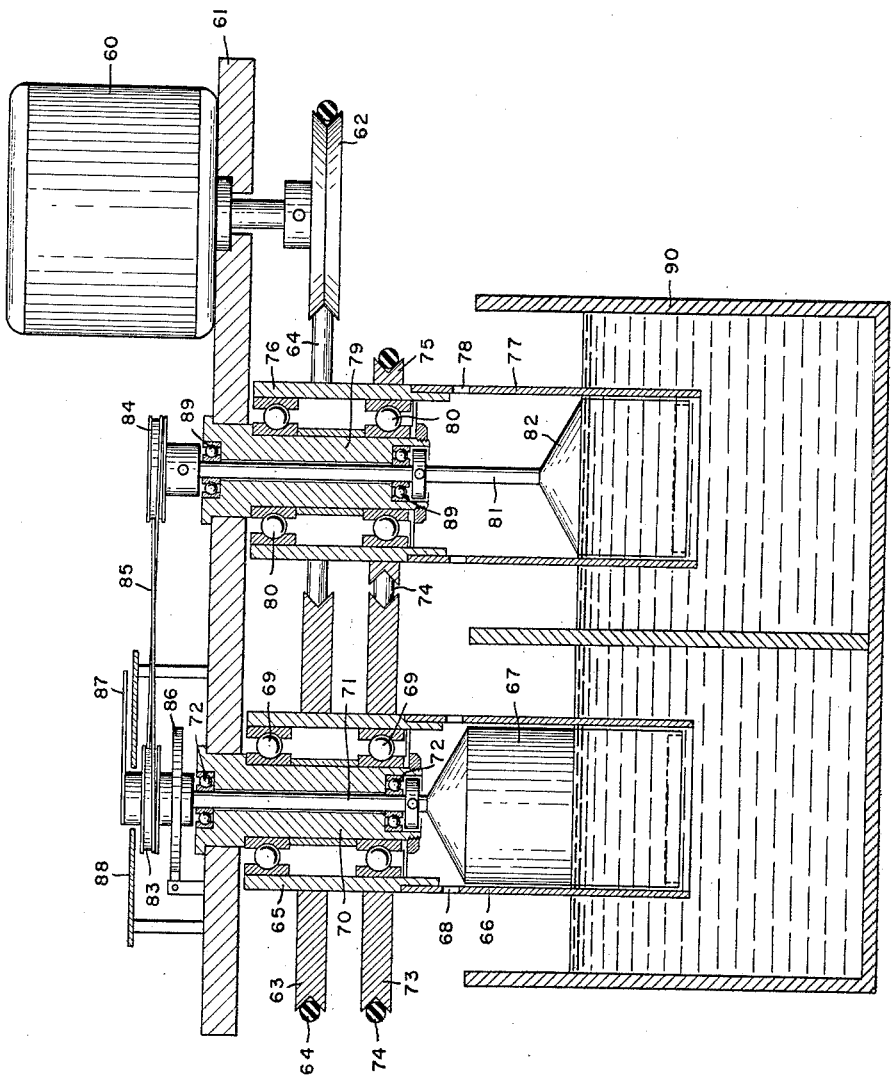
Figure 9:
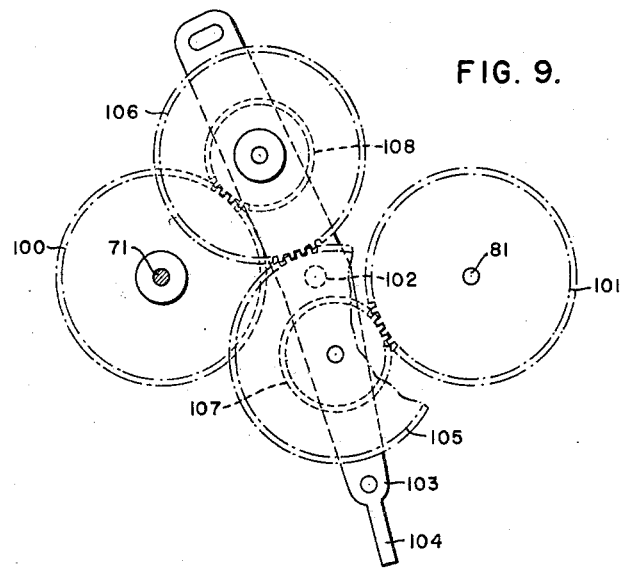
Figure 8:
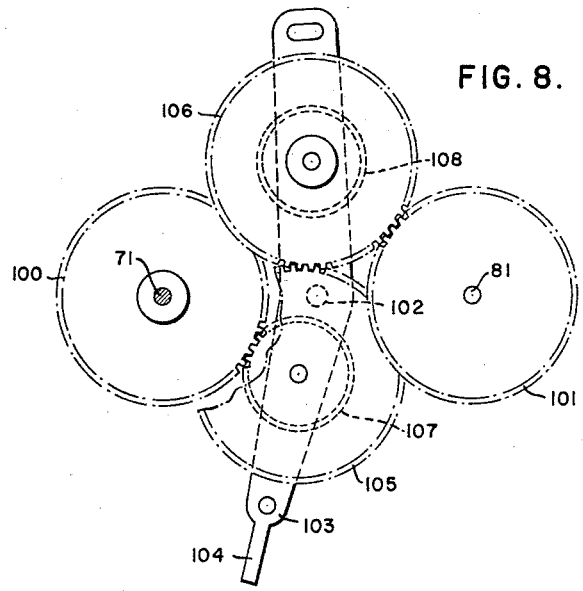
Figure 7:
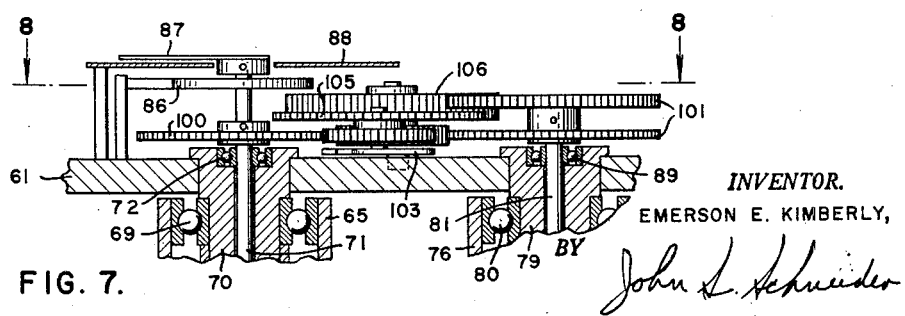

The above objects and other objects of the invention will be apparent from a more detailed description of the invention taken in conjunction with the drawings wherein:

FIG. 1 is a plot of shearing stress vs. shearing speed;
FIG. 2 is a vertical, partly sectional view showing one embodiment of the apparatus of the invention in a position prior to starting to measure viscosity or yield strength;
FIG. 3 is a view similar to that of FIG. 2 showing the apparatus in position for indicating viscosity;
FIG. 4 shows the viscosity and yield strength indicator scale;
FIG. 5 is a view similar to that of FIG. 2 showing the apparatus in position for indicating yield strength;
FIG. 6 is a vertical, partly sectional view showing another embodiment of the apparatus of the invention in a position for indicating viscosity;
FIG. 7 is a vertical, partly sectional view showing a further embodiment of the apparatus of the invention, the arrangement of which is similar to that of FIG. 6;
FIG. 8 is a view taken on lines 8—8 of FIG. 7; and
FIG. 9 is a view similar to that of FIG. 8 showing the gears in a different position.

When a Newtonian or non-Newtonian fluid is sheared successively at two different velocities, such as $S_1$ and $S_2$ (FIG. 1), two corresponding shear stresses, $D_1$ and $D_2$ are found which define two graph points, $x$ and $y$. A straight line passing through $x$ and $y$ when extended to intersect an axis will intersect at the origin of the axis 0.0 if the fluid is Newtonian and at an intercept $D_3$ on the D axis if the fluid is non-Newtonian. The slope of line $xy$ is a function of shear and viscosity and the intercept $D_3$ on the D axis is a function of yield point. A mathematical analysis illustrating the invention follows:

Thus, in FIG. 1, let $D_1$ and $S_1$ define point $x$
$D_2$ and $S_2$ define point $y$
$m$=slope of line $xy$
$D_3$=intercept on D axis
$a$=ratio of $S_2$ to $S_1$ Then (1) $$D_1 = mS_1 + D_3$$
(2) $$D_2 = mS_2 + D_3$$

Therefore, (3) $$m = \frac{D_1 - D_3}{S_1} = \frac{D_2 - D_3}{S_2}$$

$$2m = \frac{D_1 - D_3}{S_1} + \frac{D_2 - D_3}{S_2}$$

(4) $$m = \frac{D_1 - D_3}{2S_1} + \frac{D_2 - D_3}{2S_2}$$

From Equation 3

$$S_2 D_1 - D_3 S_2 = D_2 S_1 - D_3 S_1$$

and (5) $$D_3 = \frac{D_2 S_1 - D_1 S_2}{S_1 - S_2}$$

Since $S_2 = aS_1$
From Equation 5

(6) $$D_3 = \frac{D_2 S_1 - D_1 a S_1}{S_1 - a S_1} = \frac{D_2 - D_1 a}{1 - a} = \frac{a D_1 - D_2}{a - 1}$$

Then, substituting $D_3$ of Equation 6 into Equation 4

(7) $$m = \frac{D_2 - D_1}{aS_1 - S_1}$$

From this equation we can ascertain that a viscosity determination is proportional to the difference between $D_2$ and $D_1$. The denominator of Equation 7 determines the strength of the restraining spring needed to keep the indicator pointer on scale.

From Equation 6 we see that the deflection of the spring restrained indicator is proportional to $aD_1-D_2$. Thus to obtain yield strength, the low speed bob must be immersed to "$a$" times the depth which it had for viscosity.

It is apparent that any two values of S are acceptable mathematically; however, the reading of slope converted to centipoises of viscosity becomes less accurate as $S_1$ and $S_2$ approach the same value. The value of the intercept $D_3$ also becomes less accurate similarly. The plug flow speed region below $S_0$ is the lower limit for the low speed $S_1$. The turbulent flow velocity of the particular fluid is the upper limit for the high speed $S_2$.

One embodiment of the invention is illustrated in FIGS. 2, 3, and 5. As shown therein, two cups or receptacles 10 and 11 are arranged adjacent a mud table 12. Cups 10 and 11 are rotatably mounted on shafts 13 and 14, respectively, which are driven by meshed gears 15 and 16, respectively, at different speeds. These gears are driven by a suitable pulley drive 17 and motor 18. Rotatable shafts 13 and 14 are splined and extend through the lower ends 19 and 20, respectively, of cups 10 and 11 and connect to perforated plate coupling members 21 and 22, respectively. Base members 19 and 20 and the walls of cups 10 and 11 are interconnected by flexible valve elements 23 and 24, respectively. These valve elements are perforated to permit flow through cups 10 and 11 when base members 19 and 20 are spaced from the walls of cups 10 and 11, as seen in FIG. 2. However, the openings in the valve elements are closed off by sealing contact between portions of the valve elements when base members 19 and 20 are positioned adjacent the lower ends of the walls of cups 10 and 11, as seen in FIGS. 3 and 5. Base members 19 and 20 are moved toward and away from the lower ends of the walls of cups 10 and 11 to seal and unseal flexible valves 23 and 24, respectively, by means of linkages 25 and 26, respectively, which are provided with handles 27 and 28, respectively. Linkage 25 connects to a bearing housing 29 through which shaft 13 extends and linkage 26 connects to a bearing housing 30 through which shaft 14 extends. The cups and associated gears are mounted on a suitable support 31. Two bobs 35 and 36, provided with air-bubble spaces 37 and 38, respectively, are arranged above cups 10 and 11, respectively. Bob 35 is connected to a shaft 40 to which is connected a gear 41 and bob 36 is connected to a shaft 42 to which is connected a gear 43. Gears 41 and 43 mesh with a gear 44 positioned therebetween. A shaft 45 to which is connected a biasing spring 46 and a pointer 47 is connected to gear 44. The bobs and connected gears are mounted on a suitable support 48 upon which is also mounted a scale 49, which is seen more clearly in FIG. 4. Mud table 12 is provided with a mud reservoir 50, the flow from which is controlled by a gate 51.

In the operation to find plastic viscosity, cups 10 and 11, which have the same inside diameter, are rotated by means of motor 18 and pulley 17 and gears 15 and 16 and shafts 13 and 14. Cup 10 is driven at a greater speed than cup 11 as, for example, twice the speed thereof and in the opposite direction by gears 15 and 16. The mud flows continuously from reservoir 50 across the mud table 12 through the opening provided by gate 51. The gate controls the flow of the mud across the mud table at a suitable flow rate. The mud flowing from reservoir 50 flows through cups 10 and 11 when flexible valve elements 23 and 24 are open keeping the cups wet and free flowing, as shown in FIG. 2. When a viscosity reading is desired, the cups are rotated such that cup 11 rotates at a speed above the plug flow speed and cup 10 rotates at a speed below the turbulent flow speed. Then, as shown in FIG. 3, handles 27 and 28 are moved to immerse bobs 35 and 36 in the fluid in cups 10 and 11, the fluid being retained in cups 10 and 11 because upward movement of the cups also functions to seal off the openings through the flexible valves 23 and 24, respectively. Bobs 35 and 36 are immersed so that the same amount of surface is exposed to fluid in shear. Dotted line 55, shown on bob 36, is the submersion line for viscosity measurement. When bobs 35 and 36 are equally immersed, gears 41 and 43, which are energized by the drags of the mud on bobs 35 and 36, respectively, attempt to rotate gear 44 in opposite directions. Gear 44 being restrained by spring 46 assumes a position determined by the difference between the rotational forces on cups 10 and 11. The deflection of the indicator pointer 47 then is a linear function of $(D_2-D_1)$ of Equation 7, hence, the scale, as shown in FIG. 4, may be calibrated in centipoises of viscosity. Since the deflection of the spring restraining pointer is proportional to $aD_1-D_2$ for yield strength, the low-speed bob must be immersed to "$a$" times the depth which it had for viscosity.

Since in this illustration $a=2$, Equation 6 may be written:

(8) $$D_3=2D_1-D_2$$

or (9) $$-D_3=D_2-2D_1$$

Since $D_3$ as an intercept is significantly a number without sign, Equation 9 may be written as:

$$D_3=D_2-2D_1=(D_2-D_1)-D_1$$

The apparatus to obtain $m$ gives a reading proportional to $(D_2-D_1)$. Thus, to obtain $D_3$, it is only necessary to subtract $D_1$ again. This is done by doubling the fluid level on the bob for $D_1$ (bob 36). The resulting deflection of pointer 47 (shown in dotted lines in FIG. 4) will be negative since $D_3$ is temporarily considered algebraically positive so the indicating instrument must be calibrated in a negative direction from zero to show yield strength. As seen in FIGS. 2 and 5, in order for pointer 47 to show yield strength, handle 28 is advanced and cup 11 moves further upwardly until bob 36 is submerged to twice the depth needed for the viscosity reading which subtracts $D_1$ again so that the yield strength scale may be calibrated as a negative-reading scale which is proportional to $(D_2-D_1)-D_1$. The dotted line 56 on bob 36 of FIG. 2 indicates the submersion line for the yield strength.

In the illustration, the two cup diameters were equal and the cups were driven at different speeds. However, the cups may be driven at the same speeds and the diameter of cup 11 which corresponds to $D_1$ reduced and its immersed length proportionally increased to obtain the same indication as before with the same gears 41, 43, and 44. Also, it is possible to vary the gear ratios among gears 41, 43 and 44 to obtain different viscosity and yield strength measurements for the instrument. Further, while the larger diameter cup members were the driven members, it is possible to drive the lesser diameter bob members instead.

Thus, a modification instead of using the same diameter bob for $D_1$ and $D_2$, a half-diameter cup and a half-diameter bob may be used for $D_1$ and driven at $S_2$ instead of at $S_1$. In this instance, the shear per unit of surface would be the same. However, to have the same shaft torque with the same size bob, the bob must be twice as long to present the same surface. The bob for $D_1$ then may be connected to the same shaft as the larger bob for $D_2$. By revolving the cup surrounding the bob $(D_1)$ opposite to that surrounding the other bob $(D_2)$, direct subtraction is obtained as in Equation 7. By spring restraining the shaft, its deflection around a linearly-calibrated scale may be used to read $m$ calibrated in plastic viscosity units. If the cup is driven at $S_1=100$, the calibration constant may be simpler. However, as mentioned previously, $S_1$ and $S_2$ may be any speed as long as $S_1$ is above the plug flow speed $S_0$ and $S_2$ is below turbulent flow speed for the particular fluid. In this manner of operation, there is no need for accurate speed adjustment.

In the embodiment of the invention, illustrated in FIG.

6, opposing torques are achieved through crossed belting instead of meshed gears. As seen in this figure, a prime mover 60, mounted on a support 61, drives a pulley 62 which is connected to a pulley 63 by a belt 64. Pulley 63 is arranged on a cylindrical housing 65 which is mounted on bearings 69 for rotation about a stationary support member 70 through which a rotatable shaft 71 extends. A shell 66, provided with fluid overflow openings 68, is connected to the lower end of housing 65 for rotation therewith and surrounds a bob 67 which is connected to the lower end of shaft 71. Fluid, the properties of which are to be measured, is arranged in the space between shell 66 and bob 67. Shaft 71 is rotatable on bearings 72 positioned on support member 70. A pulley 73 also is arranged on housing 65. Another similar assembly of elements including a pulley 75, a housing 76, a shell 77 provided with an overflow opening 78, a central support member 79, bearings 80, a shaft 81, a bob 82, and bearings 89 is arranged on support 61. Housings 76 and 65 are interconnected for rotation together by pulleys 73 and 75 and nonslip belt 74. Pulley 75 is of smaller diameter than pulley 73 so that shell 77 is driven faster than shell 66. Also bob 82 is one-half the length of bob 67.

A sheave 83, connected to the upper end of shaft 71, and a sheave 84, connected to the upper end of shaft 81, are interconnected by a nonslip belt 85 which is crossed in order to oppose the torques produced on bobs 67 and 82 by rotation of shells 67 and 77. Belt 85 preferably is formed of fine steel wires.

Shells 66 and 77 and bobs 67 and 82 may be immersed to any desired amount in the fluid to be measured which is contained in a tank 90 by raising and lowering either the tank or the shells and bobs.

Movement of shaft 71 is restrained by means of a spring 86 which is mounted on support 61. An indicator pointer 87 is connected to the upper end of shaft 71 and provides an indication of viscosity and yield strength on a scale 88.

The operation is similar to that described for the previous embodiment. When it is desired to measure viscosity, the surfaces between bob 67 and shell 66 and bob 82 and shell 77 exposed to mud are the same and when yield strength is measured, the surface between bob 67 and shell 66 exposed to mud is twice the surface between bob 82 and shell 77 exposed to mud. When bobs 67 and 82 are equally immersed, shells 66 and 77 are rotated by means of prime mover 60 and interconnecting pulleys 62, 63, 73, and 75. The drags of the mud on bobs 67 and 82 produce torques which are transmitted to sheaves 83 and 84 and translated into opposed torques by crossed belting 85 interconnecting these sheaves. Shaft 71 being restrained by spring 86 assumes a position determined by the difference between the rotational forces on bobs 67 and 82. The deflection of the indicator pointer 87 then is a linear function of $(D_2-D_1)$ of Equation 7 and scale 88 can be calibrated in centipoises of viscosity. To obtain yield strength the surface area in the annulus between bob 67 and shell 66 is doubled and as previously described the scale 88 can be calibrated to read yield strength of the fluid.

In the embodiment of the invention, illustrated in FIGS. 7 to 9, a torque changing gear system is employed in place of the crossed belt arrangement of FIG. 6 or the gear arrangement of FIGS. 2, 3, and 5. In this system when it is desired to measure yield strength instead of doubling the surface exposed to fluid of one of the bobs to double the torque on the shaft carrying the indicator pointer, the torque increase is achieved by increasing the gear ratio from 1:1 to 2:1.

Referring, in particular, to FIG. 7, there is shown an arrangement similar to that shown in FIG. 6 except for the structure interconnecting the shafts. Thus, shaft 71 is arranged for rotation on bearings 72 mounted on a support member 70 which, in turn, is mounted on a support 61. Also, a shaft 81 is mounted for rotation on bearings 89 arranged on a support member 79 which, also, is mounted on support 61. Housings 65 and 76 are arranged for rotation on bearings 69 and 80, respectively. A scale 88 is mounted on plate 61 and a pointer 87 is connected to shaft 71. Spring 86, mounted on plate 61, retards rotation of shaft 71.

Referring more particularly to FIGS. 8 and 9, the gearing system includes gears 100 and 101 of the same diameter mounted on shafts 71 and 81, respectively, and intermediate large diameter gears 105 and 106 to which are connected small diameter gears 107 and 108, respectively. The large to small diameter gear ratio is 2:1. The intermediate gears are arranged to pivot about pivot point 102. A gear shift lever 103 provided with a handle 104 is used to shift gears 105 to 108 from one position to another. In the position of the gears, shown in FIG. 9, the engagement of gears 101—107, 105—106, and 108—100 results in the 1:1 gear ratio between gears 101 and 100 necessary for a viscosity measurement. When the intermediate gears are shifted by moving the gears about pivot point 102 by means of lever 103 to the position shown in FIG. 8 gear 108 disengages from gear 100, gear 106 engages gear 101, and gear 107 engages gear 100. This position results in the 2:1 ratio between gears 100 and 101 necessary for a yield strength measurement. While the ratio between gears 106 and 101 need not be 1:1, it will be more convenient in cutting the gears to make the diameters of gears 100, 106, 105, and 101 the same.

Having fully described the method, apparatus, and objects of the invention, I claim:

1. Apparatus for measuring fluid properties comprising:

first and second rotatable cylindrical surfaces;
means for rotating said first cylindrical surface at a speed different from the speed of said second cylindrical surface;
third and fourth cylindrical surfaces arranged concentric to said first and second cylindrical surfaces, respectively, forming a first annulus between said first and third cylindrical surfaces and a second annulus between said second and fourth cylindrical surfaces, said fluid being located in said first and second annuli;
means connected to said third and fourth cylindrical surfaces adapted to translate fluid shearing stresses caused by rotation of said first and second cylindrical surfaces into opposing torques;
means connected to said torque-translating means adapted to convert said opposing torques to a resultant torque; and
means for indicating said resultant torque.

2. Apparatus as recited in claim 1 wherein said third and fourth rotatable cylindrical surfaces are arranged within said first and second cylindrical surfaces, respectively.

3. A method for measuring properties of a single fluid comprising:

shearing simultaneously separate samples of the single fluid at different velocities;
converting said resulting shear stresses to torques;
and indicating the differences in said torques to thereby indicate viscosity or yield strength of said fluid.

References Cited in the file of this patent

UNITED STATES PATENTS

| 2,092,640 | Dallmann | Sept. 7, 1937 |
| 2,120,351 | Decker | June 14, 1938 |
| 2,122,765 | Weiler | July 5, 1938 |

FOREIGN PATENTS

| 926,094 | Germany | Apr. 7, 1955 |